United States Patent [19]

Capper et al.

[11] Patent Number: 5,596,368

[45] Date of Patent: Jan. 21, 1997

[54] CAMERA AIMING MECHANISM AND METHOD

[75] Inventors: David G. Capper, Sausalito, Calif.; Stanley H. Axelrod, Port Orchard, Wash.

[73] Assignee: Capper Technologies, Inc., Novato, Calif.

[21] Appl. No.: 313,148

[22] PCT Filed: Nov. 25, 1992

[86] PCT No.: PCT/US92/10265

§ 371 Date: Feb. 23, 1995

§ 102(e) Date: Feb. 23, 1995

[87] PCT Pub. No.: WO93/16411

PCT Pub. Date: Aug. 19, 1993

[51] Int. Cl.$^6$ ..................................................... H04N 5/225
[52] U.S. Cl. .............................................. 348/333; 348/211
[58] Field of Search ........................................ 348/333, 334, 348/207, 335, 211, 341

[56] References Cited

U.S. PATENT DOCUMENTS

| | | | |
|---|---|---|---|
| Re. 29,599 | 3/1978 | Ogawa | 354/23 D |
| 2,282,045 | 5/1942 | Fleischer | 354/165 |
| 2,642,790 | 6/1953 | Scholkemeier | 354/151 |
| 2,701,500 | 2/1955 | Schwartz et al. | 356/3.1 |
| 2,816,475 | 12/1957 | Waller et al. | 352/48 |
| 3,008,398 | 11/1961 | Sanborn | 354/165 |
| 3,754,249 | 8/1973 | Kearney, II | 342/54 |
| 3,860,935 | 1/1975 | Stauffer | 354/25 |
| 3,875,401 | 4/1975 | Stauffer | 250/208.1 |
| 4,002,899 | 1/1977 | Stauffer | 250/201.8 |
| 4,386,848 | 6/1983 | Clendenin et al. | 356/5 |
| 4,572,625 | 2/1986 | Arndt et al. | 356/4.01 |
| 4,672,436 | 6/1987 | Hawthorne | 434/22 |
| 4,689,016 | 8/1987 | Eichweber | 434/22 |
| 4,818,865 | 4/1989 | Matsui et al. | 250/201 |
| 4,884,137 | 11/1989 | Hanson et al. | 348/158 |
| 4,914,460 | 4/1990 | Caimi et al. | 354/64 |
| 4,963,017 | 10/1990 | Schneiter et al. | 356/1 |
| 4,969,006 | 11/1990 | Ishibashi et al. | 354/402 |
| 5,005,213 | 4/1991 | Hanson et al. | 455/617 |
| 5,038,162 | 8/1991 | Tejima | 354/221 |
| 5,054,917 | 10/1991 | Pepin et al. | 354/152 |
| 5,059,019 | 10/1991 | McCullaugh | 348/333 |
| 5,073,824 | 12/1991 | Vertin | 348/211 |
| 5,389,967 | 2/1995 | Kim | 348/211 |

*Primary Examiner*—Wendy Garber
*Attorney, Agent, or Firm*—Kolisch, Hartwell, Dickinson, McCormack & Heuser

[57] ABSTRACT

The invention includes a method used with a camera that is aimed toward a field of view by a light beam that produces a light pattern indentifying at least a part of the field of view. The method photographs the field of view without photographing the light pattern produced by the light beam. The method includes the steps of receiving light, producing signals representative of the received light, intermittently reading the signals to create a video photograph, where the intermittent reading results in intermissions between readings, recognizing the intermission and causing the light beam to produce the light pattern during intermissions only. The beam produces a light pattern on an object within or near the camera's field of view, thereby identifying at least a part of the field of view. The radiant energy source is often a laser and the radiant energy beam is often a laser beam. A detection mechanism detects the intermissions and produces a signal that causes the radiant energy source to project the radiant energy beam. The detection mechanism is typically an electrical circuit including a retriggerable multivibrator or other functionally similar component. In several other embodiments, a radiant energy source produces a constant beam of radiant energy. In one embodiment, a filtering mechanism detects and filters the radiant energy beam before it impinges on a sensor within the camera. In another embodiment, a filtering mechanism detects and filters the energy beam after it impinges on the camera's sensor, but before the camera produces a visual image of the field of view. In another embodiment using a pulsed beam, a modulation signature of the energy beam is decoded and suppressed before reaching the visual image created by the camera.

13 Claims, 4 Drawing Sheets

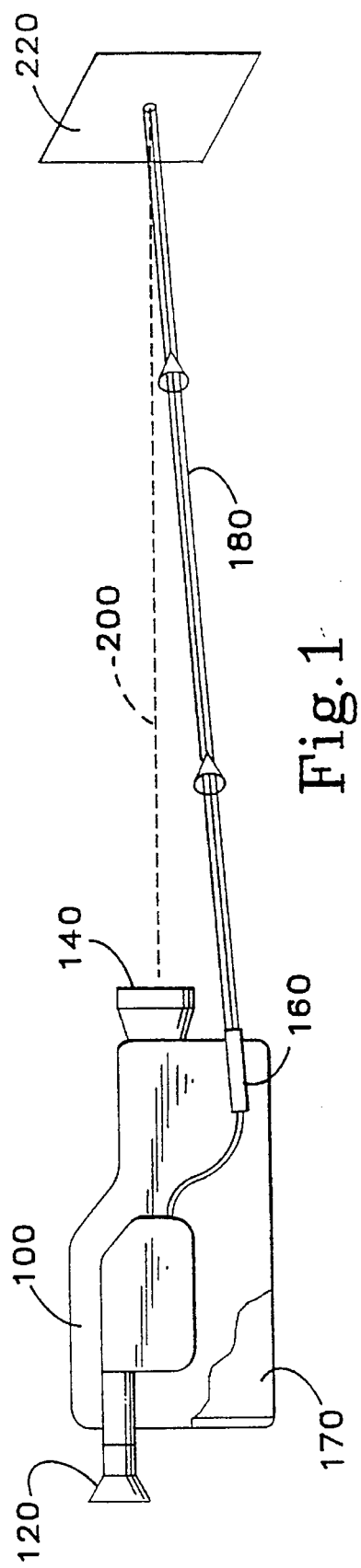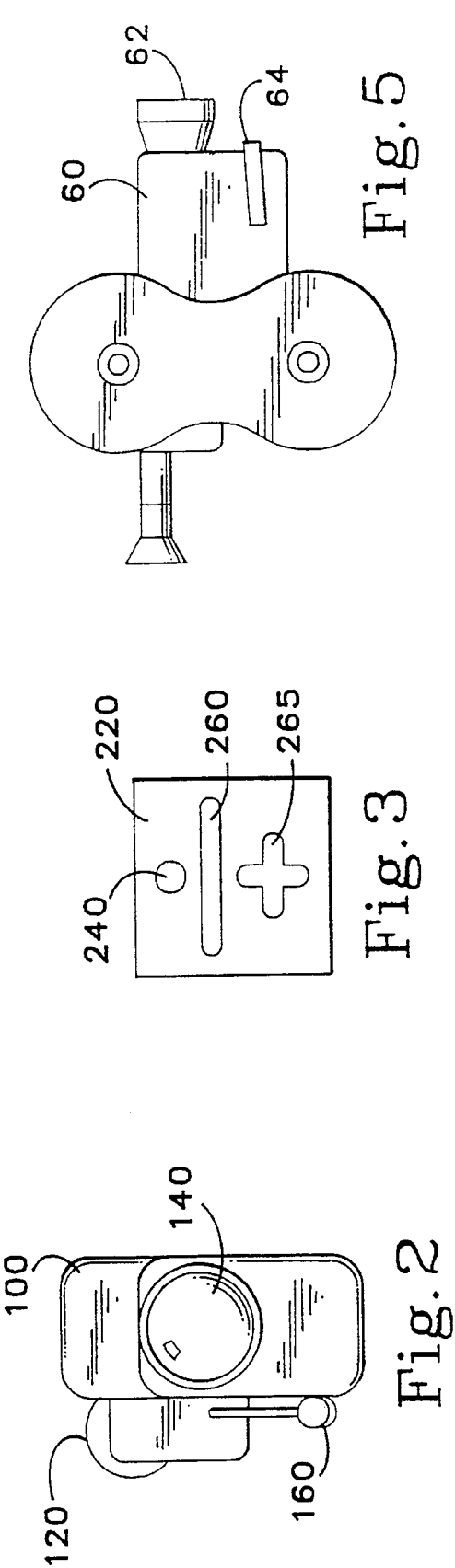

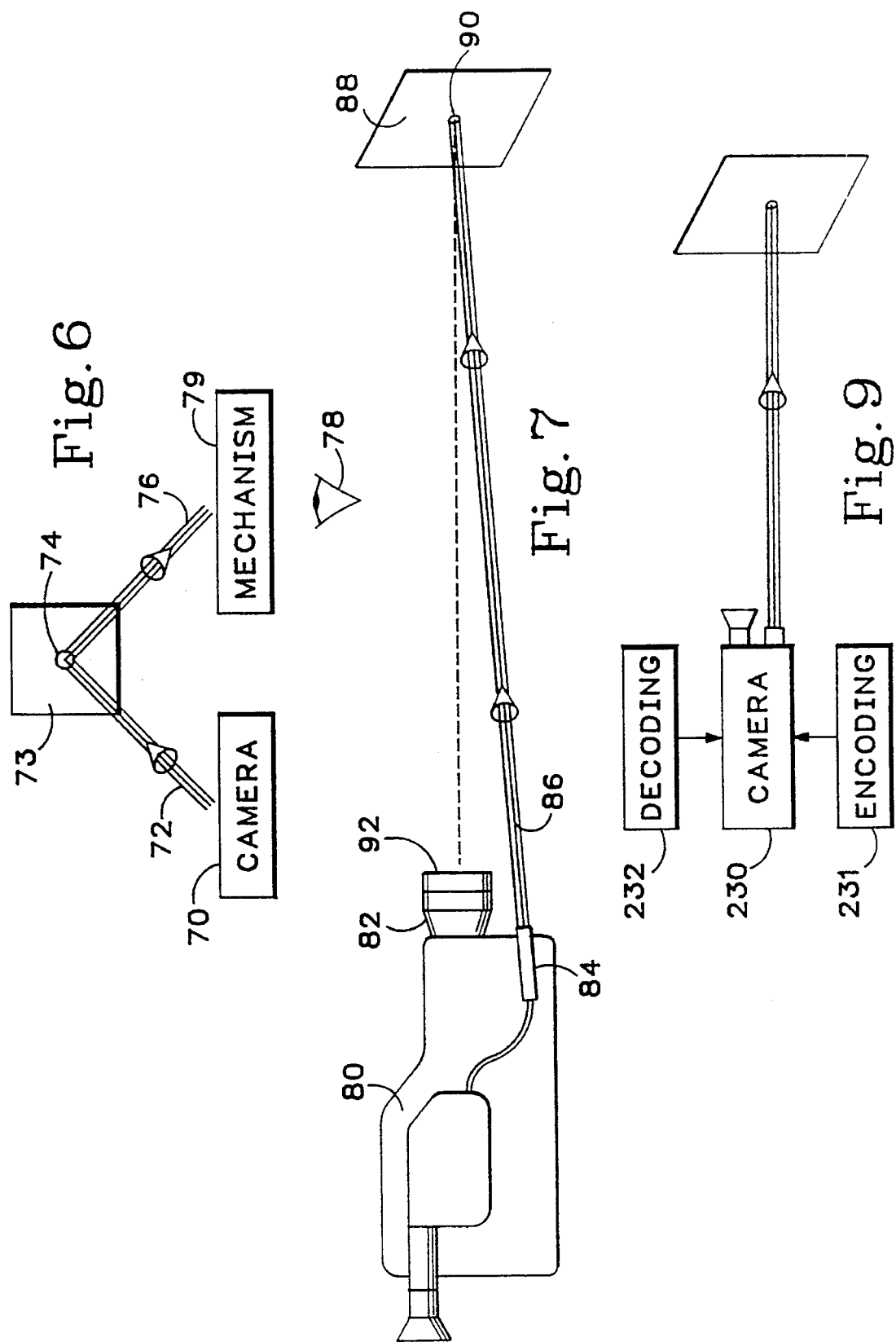

CAMERA AIMING MECHANISM AND METHOD

CROSS REFERENCE TO RELATED APPLICATIONS

This invention is an improvement on the invention described in copending U.S. patent application Ser. No. 07/813,373, filed Dec. 23, 1991. This invention is also a continuation-in-part of U.S. patent application Ser. No. 07/835,192, filed Feb. 12, 1992. Both of the aforementioned applications are included in this application by reference.

TECHNICAL FIELD

This invention relates to cameras. More particularly, this invention relates to aiming mechanisms for cameras and to methods of aiming cameras.

BACKGROUND ART

A camera is a device for taking still or moving pictures. A video camera is a camera that electronically processes an image. Typically, video cameras are used to take moving pictures or to photograph transient visual images. Television cameras and camcorders are examples of video cameras.

A video camera typically includes a body or enclosure, a lens, a viewfinder and a light-sensitive device which converts light into electrical signals. Light enters the camera by passing through the lens. The light which passes through the lens is either reflected or projected from objects within the camera's field of view. The camera's field of view is what the camera sees or what will be included in a photograph taken by the camera. The lens, in turn, focuses the light onto the light-sensitive device. The light-sensitive device then produces various electrical signals.

The electrical signals represent the light from the camera's field of view. The signals are then used to produce an image of the field of view in a viewfinder, on a television or both. Alternatively, the signals are used to record the image on video tape or some other media. The signals may also be used for other purposes.

Motion picture cameras are cameras that record images on film by opening and closing a shutter. Motion picture cameras also include a body or enclosure, a lens and a viewfinder. Light enters the camera through the lens and the shutter opens and closes allowing the light to strike film.

Both video cameras and motion picture cameras are aimed by looking into the camera's viewfinder and seeing the image displayed. Again, the displayed image is the camera's field of view or what the camera sees. The camera is properly aimed when the viewfinder displays the desired image.

In many instances, however, a user would like not to be dependent on a viewfinder to aim the camera, such as when a user is photographing motion or photographing around obstructions such as other people or other photographers. In those situations using a viewfinder makes it more difficult to properly aim the camera because the camera must be held near the person's eye. Holding a camera near an eye limits the person's peripheral vision making it difficult for the person to take photographs of moving subjects or around obstructions. It is also difficult for people who wear glasses to hold and properly aim a video camera because the glasses are interposed between the camera's viewfinder and the person's eye.

This invention addresses those shortcomings and provides a mechanism and method to aim a camera without having to look into the camera's viewfinder. Thus, the peripheral vision of the person using the camera is not limited by the camera. The invention also allows a photographer to hold a camera in any physical position, take photographs from almost any angle and even to be away from the camera and still properly aim the camera. That allows a photographer to take photographs which would otherwise be impossible to take accurately. Additionally, the invention allows a person to aim a camera by looking toward an object to be photographed, rather than by looking into a viewfinder or toward a television screen.

SUMMARY OF THE INVENTION

One embodiment of the invention includes a camera that receives light from a field of view, produces signals representative of the received light, and intermittently reads the signals to create a photographic image. The intermittent reading results in intermissions between readings. The invention also includes a radiant energy source that works with the camera. The radiant energy source produces a beam of radiant energy and projects the beam during intermissions between readings. The beam produces a light pattern on an object within or near the camera's field of view, thereby identifying at least a part of the field of view. The radiant energy source is often a laser and the radiant energy beam is often a laser beam. A detection mechanism that detects the intermissions and produces a signal that causes the radiant energy source to project the radiant energy beam. The detection mechanism is typically an electrical circuit including a retriggerable multivibrator.

One invented method is used with a camera that is aimed toward a field of view by a light beam that produces a light pattern identifying at least a part of the field of view. The method photographs the field of view without photographing the light pattern produced by the light beam. The method includes the steps of receiving light, producing signals representative of the received light, intermittently reading the signals to create a video photograph, where the intermittent reading results in intermissions between readings, recognizing the intermission and causing the light beam to produce the light pattern during intermissions only.

Another embodiment also includes a camera with a radiant energy source that produces a beam of radiant energy. The beam produces a light pattern visible to the eye, identifying the camera's field of view. This embodiment further includes a filter mechanism, more specifically, a filter system, to suppress the light pattern from the image produced by the camera. There are at least three types of filter systems or methods: pre-filtering, post-filtering, and encoding/decoding. The pre-filtering system or method filters out the wavelength of the light pattern before it hits a sensor or film in the camera. For example, if the beam is deep red, a filter is made that does not pass any light at wavelengths as long as or longer than the beam wavelength. The filter may be a lens.

The post-filtering system or method takes advantage of several characteristics of the pointer beam. The energy beam is typically a highly collimated, almost point source, which has a predictable relative brightness as compared to ambient light. Because the beam is projecting a virtual point, its image brightness will increase over a small part of the image. When a rapid red signal increase in the video output is detected in the area where the beam is suspected to be, the filter decreases the level of red signal actually allowed to reach the image produced by the camera. The amount that the red output is decreased is determined by the ratio of the rapidly increased red to the ambient conditions. This type of approach can be used both as a built-in camera feature or as a separate device used when playing back a tape.

In the encoding/decoding system or method, the pointer beam is encoded so that its modulation can be detected. Once detected, any signal with that modulation signature can be decoded and suppressed. For example, if the pointer laser were enabled during every other video field and triggered by a vertical sync pulse, the suppression system would look for any part of the video image that only occurs on alternate fields. By comparing the signal between the fields, the fields containing the beam image can be adjusted to match the intensity of the nonbeam field.

These three filter systems can be used together to maximize beam suppression. Using all three systems concurrently will minimize the impact of each used alone.

BRIEF DESCRIPTION OF THE DRAWINGS

FIG. 1 is a simplified side view of a video camera with a radiant energy source.

FIG. 2 is a simplified front view of the camera shown in FIG. 1.

FIG. 3 is a plan view of two light patterns.

FIG. 5 is a simplified side view of a motion picture camera with a radiant energy, source.

FIG. 6 is a drawing of one embodiment of the invention, using an invisible beam of radiant energy and mechanism allowing detection of a reflection of the beam.

FIG. 7 is a drawing showing a pre-filtering system.

FIG. 9 is a diagram of an encoding/decoding system.

DETAILED DESCRIPTION AND BEST MODE FOR CARRYING OUT THE INVENTION

Figure 4:
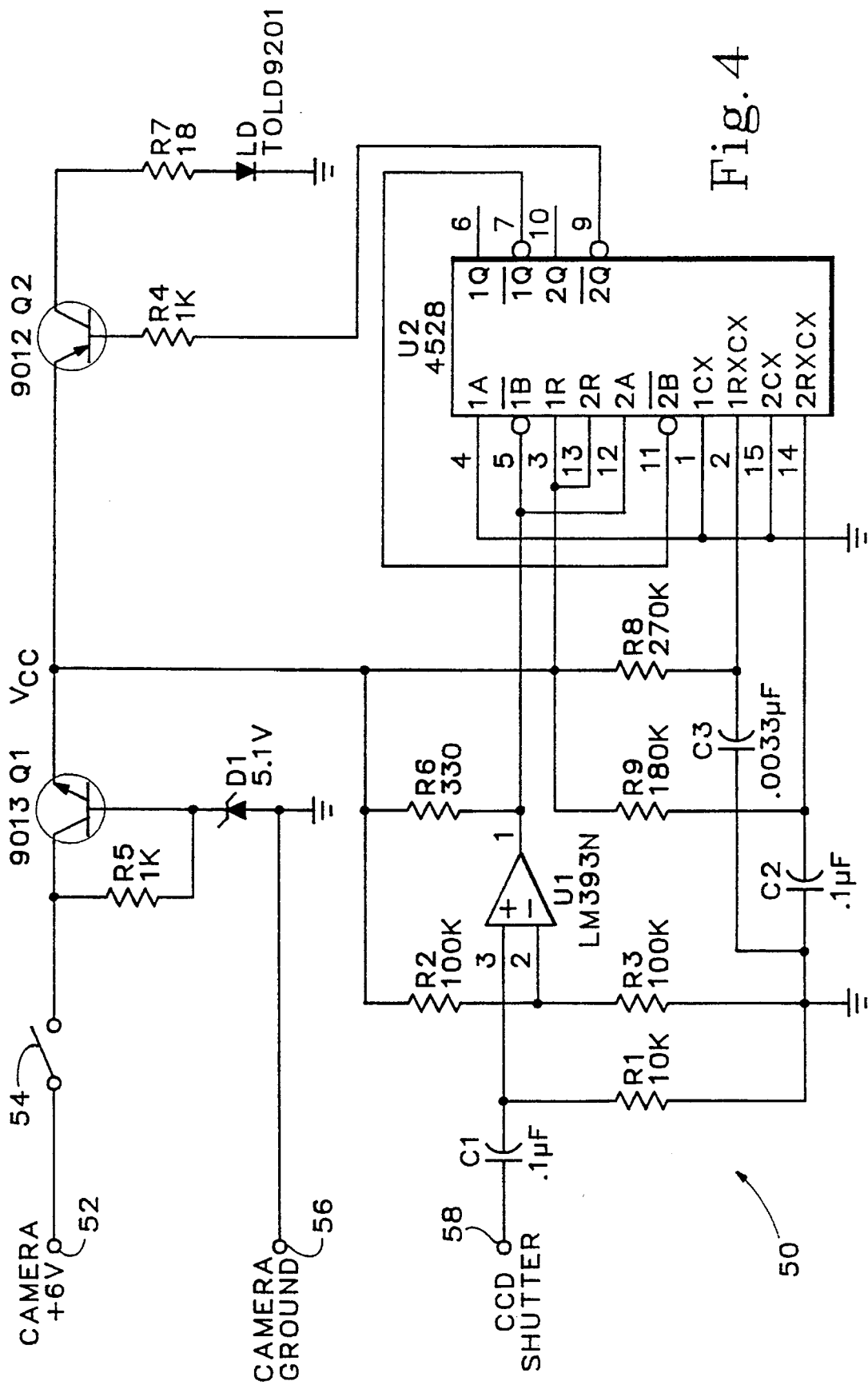
FIG. 4 is a circuit diagram of a detection mechanism for a video camera.

One embodiment of the invented photographic apparatus includes a camera such as the camcorder shown at 100 in FIGS. 1 and 2. Camcorder 100 includes a viewfinder 120 and a lens 140. Of course, other types of cameras including VHS cameras, television cameras and movie cameras may be used.

A radiant energy source 160 is mounted on an 8 millimeter camcorder 100. Radiant energy source 160 projects a radiant energy beam 180 that identifies at least a part of the camera's field of view. The radiant energy source is powered by a battery 170 within the camcorder. Alternatively, the radiant energy source may be powered by an AC connection with a DC adaptor or some other power supply.

In the preferred embodiment the radiant energy source is a laser diode and the radiant energy beam is a laser beam. Other types of radiant energy sources and beams may be used, including light emitting diodes, incandescent or halogen light sources. Additionally, multiple beams could be used. However, particular types of beams or particular light sources may be preferred in various applications.

As shown in FIG. 1, radiant energy source 160 projects a radiant energy beam 180 out from camcorder 100. Radiant energy beam 180 is directed toward a predetermined point within camcorder 100's field of view. In FIG. 1, dashed line 200 illustrates the center of the camcorder's field of view. Both beam 180 and line 200 strike a target 220. Target 220 is simply an object within the camera's field of view, it is not necessarily the main subject within the field of view. If target 220 were positioned closer to or farther away from the camcorder, then beam 180 may be adjusted. In most cases, however, the beam will not need adjusting because it is at such a small angle relative to the center of the camcorder's field of view that it strikes the target near enough to the center of the field of view to allow proper aiming. Alternatively, beam 180 could be projected parallel to line 200 or even superimposed over line 200 by mirrors that reflect the beam out through lens 140. Typically, the radiant energy beam is collimated to produce a distinguishable energy pattern when projected on an object.

In FIGS. 1 and 2 the radiant energy source is mounted on the outside of camcorder 100. Alternatively, the radiant energy source could be mounted inside the camcorder and positioned to project a beam out from the camcorder. The radiant energy source may also be mounted at different positions on the camcorder, or remote from the camcorder and simply used in conjunction with it. The beam may also be reflected out from the camcorder by mirrors.

Camcorder 100 is aimed by pointing it toward an object. The person using the camcorder causes the radiant energy source to project a radiant energy beam and then directs the beam toward the object. When the beam strikes the object, it produces a light pattern visible on the object. The object may be the subject of the photograph, something beside the subject, or any other object within the field of view. Alternatively, the beam may strike a object adjacent but outside the camcorder's field of view. By seeing the location of the light pattern on the object and by knowing the relationship between the camcorder and the light beam, the user knows where the camcorder is aimed without looking through the camcorder's viewfinder.

Typically, with a light beam the light pattern will be a dot, line or cross hair of light. A representative dot of light is shown in FIG. 3 at 240. Dot of light 240 is shown striking target 220. A representative line of light is shown at 260, also striking target 220. A cross hair or cross pattern of light is shown at 265. Cross hair 265 may define the height and breadth of the camcorder's field of view. Any other orientation of line 260 or cross hair 265, or virtually any other light pattern is possible. For example, the light pattern may be a circle or square that borders the camcorder's field of view. Line 260, cross hair 265 or other patterns may be made by projecting the line or pattern, moving the radiant energy source or by using reflectors.

The ability to aim a camera without looking through the camera's viewfinder allows for a user to look toward the scene to be photographed without sacrificing peripheral vision. This is important in photography because subjects and alternative subjects are often moving. A user's peripheral vision allows the user to see all the subjects as they move toward the camera's field of view while also aiming the camera.

Video cameras such as camcorder 100 continually process images when the camera is photographing. Thus, it is important to be able to continually aim the camera while photographing. But it is also important that the light pattern produced by the radiant energy beam not appear on the processed image. If the radiant energy beam was constantly on, then the light pattern would be visible in the processed image. The invention addresses that problem by recognizing that there are periods of time when video cameras are photographing that the cameras are insensitive to light. The invention only projects radiant energy during the time when the camera is insensitive to light. Thus, the light pattern produced by the radiant energy does not appear on the recorded image.

As stated earlier, video cameras process images by converting light into electrical signals and then either recording the signals or using them to produce an image. Light enters the video camera through a lens and strikes a light-sensitive device. The light sensitive device creates different signals depending on the intensity of the light and the length of time the light strikes the device.

The light-sensitive device, also called a sensor, for many cameras, such as television cameras, is a vidicon or an image orthicon. Vidicons and image orthicons are camera tubes, each with a light-sensitive surface such as a photoconductor like antimony trisulfide. A photoconductor is a material which changes electrical conductivity under varying amounts of light. Thus, when light strikes a photoconductor, the photoconductor's electrical characteristics change.

The photoconductor is then scanned by an electron beam. The electron beam detects the changed characteristics of the photoconductor. The changed characteristics may also be thought of as signals produced by the photoconductor, and the electron beam intermittently reads those signals.

When the electron beam scans the photoconductor, it typically begins scanning in the upper left corner of the photoconductor and proceeds across to the right and slightly downward. When the right-hand side is reached, the electron beam retraces rapidly to a position below its starting position and again proceeds to the right and slightly downward. That continues until the electron beam reaches the bottom of the photoconductor. At that point, the beam returns to the top and repeats the process, except that the beam may scan lines that fall between the previously scanned lines. The next scanning would begin where the first scanning started, the subsequent scanning would begin where the second scanning started, and so on.

Each scanning of the photoconductor is called a field. Because every other scanning traces out different horizontal lines, there are two fields to each image. In other words, each image is produced from two scans of the photoconductor or other light-sensitive device. The image produced is called a frame. Thus, each frame includes two fields.

In the United States, television cameras typically scan 525 horizontal lines and 60 fields or 30 frames every second. In Europe, television cameras typically scan 625 lines and 50 fields or 25 frames each second. Video or television photographs are simply a series of frames displayed on a television screen or other device. The frames are updated faster than the human eye can see, thus creating moving or transient images.

As stated above, after the electron beam has scanned a horizontal line or a field, the beam retraces to a new starting position. To prevent the retracing from affecting the image produced by the camera, a blanking signal or pulse is included. The blanking pulse effectively "shuts off" the beam as it returns to its new position. The periods of blanking may be thought of as intermissions between scans or between intermittent readings of the signals. The intermissions may be between horizontal scans, between entire field scans or at any other time when the beam is "shut off" or the camera is insensitive to light.

The invented aiming mechanism, when used with a vidicon, image orthicon or other similar camera, recognizes the blanking pulses and only projects radiant energy during blanking. In other words, the radiant energy is pulsed on during blanking and turned off during scanning. The pulsing is so rapid, however, that the light pattern produced by the radiant energy appears continuous to the eye.

The light-sensitive device for many video cameras is a charge coupled device or CCD. A CCD is a device which is similar to a vidicon or image orthicon because it also includes a light-sensitive surface capable of discriminating an image by converting light energy to electrical charge. The surface is made up of an array of light-sensitive elements called pixels. Each pixel is made from a light-sensitive material such as doped silicon, and each pixel can produce its own electrical signal. A typical CCD is approximately ⅓rd-of-an-inch square and may include around 300,000 pixels. Each pixel of the CCD is addressed so that each pixel's signal can be located and read when desired.

Light enters the video camera's lens and strikes the CCD. The pixels then convert the light to electrical signals. The signals are then read in a predetermined order, such as left to right and top to bottom. After the pixels are read, they are discharged or reset so that they can produce subsequent signals. The signals are then processed to create video images.

As with television cameras, the signals produced by a CCD are intermittently read over a given time period to produce fields and/or frames of images. Different video cameras may read their respective CCDs over various time periods, but a typical cycle of reading all pixels is approximately 16.7 milliseconds or ⅙₀th-of-a-second. That time is called a ⅙₀th-of-a-second shutter speed because it allows each pixel to be sensitive to light for 16.7 milliseconds, which is analogous to a shutter that is open for ⅙₀th of a second.

FIG. 4 shows an electrical circuit 50 describing a detection mechanism for use with a Canon E40 camcorder. The mechanism detects intermissions between readings and produces a signal that causes the radiant energy source to project the beam of radiant energy when the intermissions are detected.

The Canon E40 camcorder includes a CCD. It takes approximately 16.7 milliseconds to read the CCD at ⅙₀th-of-a-second shutter speed. The Canon E40 camcorder also allows the user to choose between shutter speeds of ⅙₀th-of-a-second, ¹⁄₁₀₀th-of-a-second and ¹⁄₁₀₀₀th-of-a-second. Faster shutter speeds take in less light so are a disadvantage in low light situations, but they reduce blurred motion.

The circuit shown in FIG. 4 is designed for a shutter speed of ¹⁄₁₀₀th-of-a-second because at that shutter speed the camera's pixels are only sensitive to light for 10 milliseconds. Even at ¹⁄₁₀₀th-of-a-second shutter speed it still takes approximately 16.7 milliseconds to read all the signals produced by the pixels, so that leaves a period of around 6.7 milliseconds during each reading of the CCD when the pixels are insensitive to light. That 6.7 millisecond period is an intermission or blanking period between readings of the signals. The circuit shown in FIG. 4 is designed to project a radiant energy beam only during each 6.7 millisecond intermission when the camera is insensitive to light.

Circuit 50 is powered at 52 by the Canon E40 battery, which supplies approximately positive 6 volts. As stated, the circuit could be powered by another power supply. The power to the circuit is controlled by on/off switch 54. The circuit is grounded at 56 by the camera's ground. The circuit powers and controls a standard TOLD9201 laser diode labeled LD in FIG. 4. The laser diode projects a laser beam when triggered.

R5 is a 1 k resistor connected to both a zener diode D1 with a zener voltage of 5.1 V and to a 9013 transistor labeled Q1. The resister, diode and transistor constitute a simple voltage regulator to ensure that the laser diode is not overdriven if the voltage from the camera should get too high.

Point 58 is connected to the CCD shutter signal produced by the camera. At 1/100th-of-a-second shutter speed, the camera produces a 3 microsecond-long electrical pulse every 60 microseconds during each 6.7 millisecond period when the pixels are insensitive to light. Those pulses are blanking pulses which cause the CCD's pixels to be insensitive to light. Circuit 50 detects those pulses and uses them to trigger the laser diode.

The pulses from the camera are first compared by the comparator including R2, R3, R6 and operational amplifier LM393N labeled U1 in FIG. 4. The comparator simply ensures a useable voltage. The numbers 1 through 3 surrounding operational amplifier U1 designate pin numbers for the LM393N chip. Pin 8 on the LM393N chip is held at $V_{cc}$ and pin 4 is held at ground.

Capacitor C1 is a 0.1 microfarad capacitor. It works with resistor R1, a 10 k ohm resistor, to change the CCD signal to bring the signal within the range of the comparator.

The output of the comparator is connected to two retriggerable monostable multivibrators or one-shots. One-shots are devices that produce an output signal when they receive an appropriate input signal. Retriggerable means that the output from the one-shot is retriggered or extended if the one-shot receives the appropriate input signal during the output of a signal. The one-shots form part of a 4528 chip labeled U2 in FIG. 4. The numbers surrounding the outside of U2 designate pin numbers for the 4528 chip. The manufacture and operation of the 4528 chip is well known.

The inputs to the two one-shots are labeled 1 and 2, respectively, on the inside of the chip. 1A and 1B are inputs for the number 1 one-shot and are located at pins 4 and 5, respectively. The outputs for the number 1 one-shot are labeled 1Q and are located at pins 6 and 7, respectively. 2A and 2B are inputs for the number 2 one-shot and they are located at pins 12 and 11 respectively. The outputs for the number 2 one-shot are labeled 2Q and they are located at pins 9 and 10, respectively. As is evident from FIG. 4, the outputs on both pins 6 and 10 are not used. Additionally, pin 16 on the 4528 chip (not shown) is held at $V_{cc}$ and pin 8 on the chip (not shown) is held at ground. As shown in the drawing, the output of the comparator is connected to pins 5 and 12 of the 4528 chip.

The time duration of the output signal for the number 1 one-shot is controlled by the resistance-capacitance combination input at 1RXCX. That combination is defined by C3 and R8, which are connected to the one-shot at pin 2. The value of C3 is 0.0033 microfarads and the value of R8 is 270 k ohms. Those values produce an output signal slightly larger than 60 microseconds.

The time duration of the output signal for the number 2 one-shot is controlled by the resistance-capacitance combination input at 2RXCX. That combination is defined by C2 and R9, which are connected to the one-shot at pin 14. The value of C2 is 0.1 microfarads and the value of R8 is 180 k ohms. Those values produce an output signal for the number 2 one-shot of slightly less than 6.7 milliseconds.

The appropriate triggering signal for the number 1 one-shot is a falling edge of a voltage, as represented by the circle at the input of 1B. Additionally, both 1A and 1B enable each other. In other words, 1B only detects a falling-edge when 1A is held low, but 1A is always low because it is connected to ground.

The appropriate triggering signal for the number 2 one-shot is a rising edge of a voltage. 2A and 2B are also enabling for each other. 2A only detects a rising voltage if 2B is high. The circle at the input of 2B indicates what signal causes a response by the one-shot.

Pins 3 and 13 on chip 4528 are reset lines which are held high so as not to reset any output. Those inputs are labeled 1R and 2R, respectively. Pins 1 and 15 are labeled 1CX and 2CX, respectively. They are connected to ground and provide access to ground for the chip, C2 and C3.

The first CCD blanking pulse travels from the comparator to pins 5 and 12 on the 4528 chip. Initially the pulse has a rising edge. The number 1 one-shot is not triggered because it does not respond to a rising voltage. One-shot number 2, on the other hand, detects the rising edge and produces an output signal at pin 9. The output signal is defined by the input at 2RXCX and is somewhat less than 6.7 milliseconds in duration. The signal is changed from high to low, as represented by the circle at pin 9. The signal current is limited by resistor R4 and is connected to a 9012 transistor at Q2. Transistor Q2 acts like a switch to control the laser diode. Resistor R7 simply limits the current to the laser diode.

Thus, the laser diode is driven by the output of the number 2 one-shot. With the values selected, the diode is on approximately 6.2 milliseconds or 37% of the time.

The initial CCD pulse is approximately 3 microseconds long. At the end of that time, the number 1 one-shot detects the signal's falling edge and produces an output at pin 7. That output is connected at pin 11 to the input 2B. The output signal is initially high, but changed to low at the circle on pin 7. The low signal disables the number 2 one-shot, thus making the number 2 one-shot unaffected by subsequent pulses. The number 1 one-shot's output signal is slightly larger than 60 microseconds. Therefore, it keeps retriggering as the number 1 one-shot detects subsequent falling edges of CCD pulses and disables the number 2 one-shot for the entire time that CCD pulses are detected. The time that CCD pulses are detected is during the intermission or blanking period.

The laser stops firing off after the number 2 one-shot signal expires, and the camera reads the CCD. The CCD is then blanked and the process repeats. Thus, the number 2 one-shot triggers the laser diode once for about 6.2 milliseconds during each intermission. The difference between the 6.2 millisecond laser firing period and the 6.7 millisecond output signal from the number 2 one-shot is caused by resistor R7.

The circuit shown in FIG. 4 is a retrofit to the existing Canon E40 camcorder. If the invention was integrated into the design of a camera, different circuits may be used and blanking pulses could be supplied whenever desirable. For example, different circuits with appropriate blanking intervals may be used for high definition television. Different circuits may include different components, including discreet transistors, counter chips or microprocessors, and still trigger a radiant energy source during intermissions. Additionally, different and more powerful lasers may also be used requiring less "on" time, thus allowing for shorter laser pulses.

FIG. 5 shows at 60 a motion picture camera incorporating the invention. As stated above, motion picture cameras are cameras that record images on film by opening and closing a shutter. Thus, the film may be referred to as a sensor.

Camera 60 includes a lens 62 and a radiant energy source 64. Radiant energy source 64 would only project a beam of radiant energy when the camera's shutter is closed. Thus, the beam would be pulsed on and off corresponding to the closing and opening of the camera's shutter.

The actual mechanism triggering the radiant energy source may be similar to the circuit shown in FIG. 4, but triggered by a signal from a light meter rather than a CCD signal. The light meter, in that case, would detect the presence of light on the film, thereby signalling when the shutter is closed. Other mechanisms may also be used to signal the opening and closing of the shutter.

Motion picture camera 60 receives light through lens 62. A shutter opens and closes allowing the light to strike the film within the camera. The opening and closing of the shutter may be thought of as producing signals representative of the received light. Allowing the light to strike the film may be thought of as intermittently reading the signals to create a photographic image. The periods of time when the shutter is closed may be thought of as intermissions between readings.

Radiant energy sources that project invisible energy beams, like ultraviolet, infrared or x-ray beams, may be used with an appropriate ultraviolet, infrared or x-ray camera, or they may be used to aim a camera toward fluorescent or phosphorescent objects. If the radiant energy source projects ultraviolet, infrared or other light invisible to the naked eye, the user may need special glasses, such as standard infrared goggles known in the art, or another device to detect or see the light pattern. In that case, if the user is using a camera that detects light visible to the naked eye, then the radiant energy beam can be projected continuously, without pulsing because it will not be detected by the camera.

FIG. 6 shows a camera 70 emitting an invisible energy beam 72. Beam 72 strikes an object 73 making a pattern 74. The pattern is visible to an eye 78 of an observer because reflected beam 76 is received by mechanism 79. The mechanism may be infrared glasses, phosphorescent surfaces, or other known mechanisms for observing spectrums of radiant energy usually invisible.

Another embodiment includes a camera with a radiant energy source that produces a radiant energy beam. The radiant energy beam is a constant, visible beam. The embodiment also includes a filter system to suppress the reflection of the beam so it does not appear in an image produced by the camera. There are three types of filtering systems or methods: pre-filtering, post-filtering and encoding/decoding. The pre-filtering system or method filters out the beam's reflection before it contacts the camera's sensor. The post-filtering mechanism filters the beam's reflection after it contacts the camera's sensor, but before the camera produces a visual image from the light impinging on the sensor. In the encoding/decoding system or method, a modulation signature of the beam is decoded and suppressed before the camera produces a visual image of the field of view.

In this embodiment, the energy beam need not be intermittently transmitted for pre-filtering and post-filtering. Rather, the beam can be continuously projected into the field of view.

In the pre-filtering system or method, an optical filter filters out the wavelength of the continuously projected pointer beam before it hits the sensor. If the beam is in the deep red, such as 670 nm, a filter can be made that does not pass any light at wavelengths as long as or longer than the beam wavelength. This does not allow real images in the deep red to be recorded, but a steep filter has a relatively small effect on the overall image color accuracy. The "steepness" of a filter describes the drop-off per frequency change. The filter can be retrofitted on existing cameras. If other cameras using this pre-filtering method were retrofit with pointers of the same wavelength, the pointer images would be suppressed by all cameras with the filter.

FIG. 7 shows a camera 80 with a lens 82 and a radiant energy source 84 projecting a beam of energy 86. Beam 86 strikes an object 88, and makes a light pattern 90. A filter 92, on lens 82 of camera 80, filters light having a wavelength of the beam, thereby preventing the camera 80 from seeing the pattern 90. The filter can be any standard filter, such as known lenses.

The post-filtering system or method uses a camera with a highly collimated, almost point source, light beam. The beam causes the brightness of a portion of the camera's field of view to increase over a small known part of the image. The part of the image is known because the beam is generally centered in the camera's field of view.

In a video system using a deep red colored beam, a circuit is used to find a rapid red signal increase in the video output and in the area the circuit predicts the beam should be. Once detected, the circuit decreases the level of red signal actually allowed to reach the tape or monitor. The amount of decrease of the red output is effected by the ratio of increased red to ambient conditions.

The post-filtering system or method should first attempt to verify that a beam exists. That is accomplished by analyzing the location where the beam is expected in order to ensure that the signal increase in red is indeed due to the laser point source, and not something red that belongs in the picture. The circuit verifies that the red output signal is changing, thus confirming a beam exists. Analog or digital circuitry can be used for this process. However, a digital signal processing system is most flexible in identifying the pointer and filtering it from the final visual image.

This type of filtering approach can be used both as a built in camera feature, a separate image playback mechanism used, for example, when playing back a tape, or installed as a retrofit on an existing camera. Additionally, when the system is used to process already recorded tapes, circuitry can be used to recognize and suppress the beam's reflection, other types of reflected beams, and even other features. This is accomplished by using a base frame to define a feature of interest and then making the system recognize that feature in subsequent frames, even if the feature moves to a different area of the picture.

Figure 8:
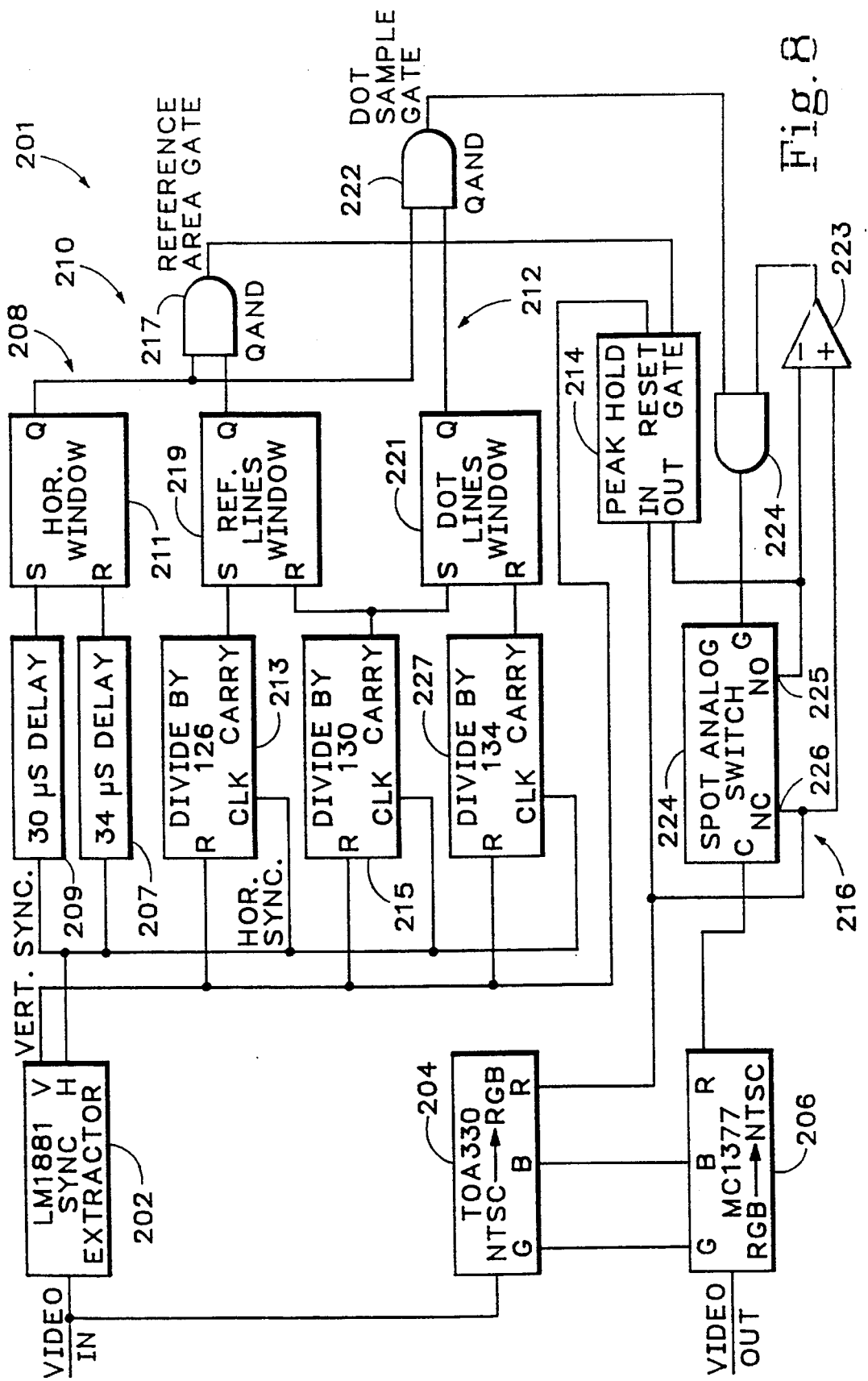
FIG. 8 is circuit diagram of a post-filtering system for a video camera.

FIG. 8 shows a circuit 201 to accomplish post-filtering in a video camera. The circuit suppresses, or filters, the image of a red pointer or dot projected into a field of view, by comparing the red signal level at the expected location of the pointer with the red signal level in an adjacent reference area where the pointer is absent. When the red level in the dot area exceeds the peak red level in the adjacent area, the pointer area red level is reduced to the peak reference red level.

FIG. 8 is generally shown in functional block level for ease of explanation. All blocks are standard well known designs. All scan line numbers and timings are based on an NTSC standard video field.

The location of the pointer or dot is defined as the center 6% of the #130–134 horizontal scan lines of each field. The reference area is defined as the center 6% of the #126–129 horizontal scan lines of each fields.

The primary block functions of circuit 200 are a sync extractor 202, an RGB extractor 204, an RGB-NTSC converter 206, a horizontal window gate generator 208, a reference area gate generator 210, a dot area gate generator 212, a reference peak level detector 214, and red switching circuit 216.

Sync extractor 202, extracts the vertical and horizontal sync signals from the incoming NTCS video. Sync extractor 202 is constructed around a LM 188 1 sync extractor chip.

The RGB extractor 204, separates the incoming video into its red, green and blue components. RGB extractor 204 is constructed around a TDA3330 RGB separator chip. The green and blue components are passed unaltered to the RGB-NTSC converter 206. Thus, the RGB extractor 204, only operates on the red component.

The RGB-NTSC converter 206, recombines the red, green, and the blue components into a standard NTSC signal, which is the processing system output. The converter 206, is built around a standard MC1377 chip.

The horizontal window gate generator 208, creates a 4 µS pulse that starts 30 µS after each horizontal sync signal, as indicated by block 209. Since each horizontal scan line lasts 63.5 µS, this 4 µS pulse occurs in the middle of each scan line, and is about 6% of the scan line time. The horizontal window gate generator 208, is built around two 4538 precision dual one-shots, and one section of a 4043 quad R-S latch, signified by block 211. One 4538 is wired so that it emits a 1 µS pulse 30 µS after the horizontal sync signal. This pulse sets the output of the 4043. The other 4538 emits a 1 µS pulse that starts 34 µS after the horizontal sync signal, as shown by block 207. This pulse resets the output of the 4043, which is the horizontal window gate.

Reference area gate generator 210, enables the horizontal window gate only during scan lines #126–129. The reference area gate generator 210, consists of four 74LS193 divide by N counters, as shown at 213 and 215, one section of the 4043, as signified by 219, and one section of a 4081 quad AND gate. Two 74LS193's are configured as a divide by 126-counter, at 213, and the other two as a divide by 130-counter, at 215. Both counters axe reset at each vertical sync pulse, and count horizontal sync pulses. When the first counter reaches a 126-count it sets the 4043. When the other reaches a 130-count it resets the 4043. The output of the 4043 is ANDed with the horizontal window gate at 217. The AND gate output is the reference area gate and consists of four 4 µS pulses.

Dot area gate generator 212, enables the horizontal window gate only during scan lines #130–134. Dot area gate generator 212 functions in a similar manner to the reference area gate generator, except that the existing 130-counter is used to set another 4043 R-S latch, and another pair of 74LS193's set to a 134-count by block 227 is used to reset the 4043 as signified by block 221. The output of the 4043 is ANDed with the horizontal window gate at 222. The AND gate output is the dot area gate and consists of five 4 µS pulses.

Reference peak level detector 214, holds the peak red signal measured over the four reference area gate pulses in each video field. The circuit is a standard peak detector built around an LF357 which is reset by one analog switch section of a 4066 every vertical sync period. The input to the peak detector is gated through another 4066 section controlled by the reference area gate.

Red switching circuit 216, compares the reference red signal level stored in the peak detector with the current red level during the five periods that the dot area gate is enabled. If the reference red signal is stronger than the current red signal, the current signal is passed unaltered to the MC1377 RGB-NTSC converter 206. If the current red signal is stronger, the reference red signal is passed to the MC1377. By this method, the red level in the dot area can never exceed that in the reference area. An LM393 comparator 223 is used to compare the two signals levels. Its output is ANDed at 224 with the dot area gate. This signal is used as the control for a SPDT analog switch 224 constructed from three 4066 sections. The normally open switch contact 225 and the comparator inverting input is the peak detector output, and the normally closed switch contact 226 and the comparator non-inverting input is the current red level. The switch swinger is the output to the MC1377.

Circuit 200 is an example of a simple approach to reducing the image of a pointer or dot in the final video image. The components described are not the only ones that could be used to accomplish the goal, but are simple and quickly available in most labs. The circuit will be easily understood by one skilled in the art.

Several other modifications can be implemented to further reduce the pointer image. The size of the reference and dot area gates can be readily altered for different size dot images by altering the horizontal window delay times and by altering the scan lines counts of the reference and dot gate circuits. The reference window can be easily expanded to include signals from the dot area scan lines immediately before (to the left of) the dot area gate. This would be accomplished with an additional horizontal gate window generator, logically combined with the dot area counters and ORed with the existing peak hold gate. The system may also include reference areas after the dot area gate by similar methods. The system reset would then act every other vertical sync (once each video frame), and the values from the previous field would be included in the current field decision making. In addition, instead of simply clipping the maximum red value if it exceeds the reference level, the red switching circuit can be turned into a system that offsets the maximum dot red level to the reference level, but still allows variations in the dot area red to pass through. This would require storing the peak dot area level from one field and using that to adjust the next field's offset.

The encoding/decoding system or method also uses a camera with a radiant energy beam, but the beam is modulated or encoded, as is known in the art, so that the modulation can be detected by a suppression system. Once detected, the signal with the modulation can be decoded and suppressed. For example, if the beam is enabled every other video field and triggered by a vertical sync pulse (encoding), the suppression system can then look for any part of the video image that only occurs on alternate fields (decoding). In other words, one field is compared with the other field. Generally there will not be a large change in colors between adjacent fields. By looking at the fields and noting a change of a certain color, i.e., red, then the change due to the beam can be reduced by modifying the one field to appear more like the other. By so doing the field containing the beam's image can be adjusted to match the non-beam field. This system is generally illustrated in FIG. 9 by camera 230 working with an encoding mechanism 231 and a decoding mechanism 232.

This system can also process reflections of the beam as well as the original image produced by the beam because it can look for any signals that fit the modulation signature. It can also be built as a retrofit or as a separate unit to decode the recorded image.

INDUSTRIAL APPLICABILITY

This invention is applicable to the photography industry. Specifically, it is applicable to video and motion picture cameras and to video and motion picture photography. While preferred embodiments have been disclosed, changes may be made thereto without departing from the spirit of the invention.

We claim:

1. A photographic apparatus capable of being aimed without looking through a viewfinder, the apparatus comprising:

a camera for producing a photographic image, the camera defining a field of view;

an electronic light-sensitive sensor within the camera, wherein the photographic image is produced by light from the field of view impinging on the sensor, and wherein such impinging light is capable of being read for producing an image;

a radiant energy source operatively associated with the camera and configured to produce a beam of radiant energy and to project the beam of radiant energy irrespective of whether light impinges on the sensor to identify at least a part of the field of view by producing an energy pattern on an object having a known position relative to the field of view; and a filter operatively associated with the camera and the radiant energy source and configured to substantially suppress the energy pattern before light from the field of view impinges on the light-sensitive sensor so that a photographic image is produced by the camera irrespective of whether the radiant energy source is producing the beam of radiant energy.

2. The photographic apparatus of claim 1 where the beam has a predetermined wavelength and the filter optically filters energy of the same wavelength as the beam to prevent the energy pattern from impinging on the sensor.

3. The photographic apparatus of claim 2 where the filter includes a lens.

4. A photographic apparatus comprising:

a camera for producing photographic images, the camera having a field of view;

an electronically-scannable, light-sensitive sensor operatively connected to the camera and configured to receive light from the field of view, wherein the photographic images are produced, in part, by scanning the sensor and the light received thereby to produce at least one scan which is thereafter used by the camera to produce a photographic image;

an aiming mechanism operably connected with the camera, including a radiant energy source configured to produce a beam of radiant energy and to project the beam of radiant energy to identify at least a part of the field of view wherein the beam is capable of reflecting from the field of view and impinging on the light-sensitive sensor; and a suppression system operably connected with the camera and configured to substantially remove a reflection of the beam from the scan which has been produced by comparing at least a portion of a scan which contains the reflected beam to a portion of a scan which does not contain the reflected beam and modifying the portion of the scan which contains the reflected beam so that it appears more like the portion of the scan which does not contain the reflected beam.

5. The apparatus of claim 4 where the beam is modulated for detection by the suppression system.

6. The apparatus of claim 5 where the camera is a video camera that repeatedly scans fields, the beam is modulated to project during predetermined fields, and the suppression system removes the reflection of the beam from the fields scanned when the beam was projected by comparing those fields with other fields scanned when the beam was not projected, and then modifying at least part of the fields scanned when the beam was projected to replicate the fields when the beam was not projected.

7. The photographic apparatus of claim 4, where the radiant energy beam is directed toward a known position in the camera's field of view, and the suppression system includes circuitry that suppresses the beam by knowing its general position in a scan, comparing it with a portion of the same scan which does not contain the beam, and modifying the portion of the scan which contains the beam so that it appears more like the portion of the same scan which does not contain the beam.

8. The photographic apparatus of claim 4 wherein the suppression system includes an image playback mechanism that includes circuitry to substantially remove the energy beam from a photographic image produced by the apparatus.

9. A method of photographing a field of view with a camera that has a sensor configured to receive light from the field of view which light is used by the camera to produce a photographic image, and a radiant energy source capable of projecting a beam of radiant energy to identify at least a part of the field of view, the method comprising:

projecting the beam;

aiming the camera by moving it until the projected beam produces an energy pattern on an object having a known position relative to the field of view, thereby identifying the desired field of view;

receiving light from the field of view;

creating a photographic image of the field of view by reading the sensor's received light to produce at least one scan; and suppressing the energy pattern produced by the light beam and appearing in the scan so that the light pattern does not appear in the photographic image by comparing at least a portion of a scan which contains the pattern to a portion of a scan which does not contain the pattern and modifying the portion of the scan which contains the pattern to appear more like the portion of the scan which does not contain the pattern.

10. The method of claim 9 where the beam of radiant energy is energy of a predetermined wavelength, the step of projecting the beam directs the beam to a known position relative to the field of view, and the step of suppressing includes identifying the known position and reducing the intensity of energy patterns produced by energy of the predetermined wavelength at the known position.

11. The method of claim 9 where the camera is a video camera that repeatedly scans fields, and the step of projecting projects the beam only during the scanning of every other field, and the step of suppressing compares the signals from fields scanned when the beam was projected with fields scanned when the beam was not projected, and modifies at least part of the fields scanned when the beam was projected to replicate at least part of the fields when the beam was not projected.

12. A photographic apparatus with a non-viewfinder-dependent aiming capability, the apparatus comprising:

a camera having a field of view and a sensor for receiving light from the field of view which is used by the camera to produce a photographic image, wherein the image is produced, in part, by the camera reading the sensor and the light received thereby;

a radiant energy source operatively associated with the camera for producing a beam of radiant energy invisible to the naked eye and for projecting the beam of radiant energy to identify at least a part of the field of view by producing an energy pattern on an object having a known position relative to the field of view; and a detector configured to allow a user to detect the energy pattern by making the invisible energy pattern visible to the user.

13. A photographic apparatus with a non-viewfinder-dependent aiming capability, the apparatus comprising:

a camera having a field of view and an electronic sensor for receiving light from the field of view which is used by the camera to produce a photographic image, wherein the image is produced, in part, by the camera intermittently reading the sensor and the light received thereby;

a radiant energy source operatively associated with the camera and configured to produce a beam of radiant energy irrespective of whether the sensor is being read by the camera to identify at least a part of the field by producing an energy pattern on an object having a known position relative to the field of view; and a filter operatively associated with the camera and the radiant energy source and configured to make the discernable energy pattern substantially invisible to the camera.

* * * * *